United States Patent [19]

Riviere et al.

[11] 3,993,422
[45] Nov. 23, 1976

[54] MACHINE FOR THE MANUFACTURE OF TWISTED DOUGH ARTICLES

[75] Inventors: Jacques Riviere, Reims; Raymond Simon, Soisy-sur-Seine, both of France

[73] Assignee: Lu, Brun & Associes S.A., Athis-Mons, France

[22] Filed: Mar. 31, 1975

[21] Appl. No.: 563,574

Related U.S. Application Data

[62] Division of Ser. No. 338,743, March 7, 1973, Pat. No. 3,889,012.

[30] Foreign Application Priority Data

Mar. 10, 1972   France .............................. 72.08519

[52] U.S. Cl. ........................... 425/304; 425/305 R; 425/321; 425/391
[51] Int. Cl.² ............................................ A21C 11/10
[58] Field of Search ........................... 425/304–306, 425/289, 307, 319–322, 391; 426/499–503

[56]   References Cited
UNITED STATES PATENTS

| | | | |
|---|---|---|---|
| 1,582,382 | 4/1926 | Collins | 425/320 |
| 1,906,847 | 5/1933 | Fitzgerald | 425/321 |
| 3,038,418 | 6/1962 | Gugler | 425/391 |
| 3,512,990 | 5/1970 | Slaybaugh | 426/502 |

FOREIGN PATENTS OR APPLICATIONS

| | | | |
|---|---|---|---|
| 1,955,465 | 4/1969 | Germany | 425/305 |
| 32,938 | 6/1934 | Netherlands | 425/321 |
| 1,170,748 | 11/1969 | United Kingdom | 425/319 |

*Primary Examiner*—Francis S. Husar
*Assistant Examiner*—Carl Rowold
*Attorney, Agent, or Firm*—Kurt Kelman

[57]   ABSTRACT

A machine for the manufacture of twisted pastry bars comprises coplanar and spaced-apart supply and discharge belts, the supply belt being advanced intermittently to convey a strip of dough to a cutting station where the strip is cut into successive, transversely extending ribbons. Pairs of facing upper and lower conveyor belts are positioned between the supply and discharge belts, the conveyor belts defining therebetween a coplanar bed for conveying the successive ribbons to the discharge belt which supports and removes the twisted bars. While the ribbons are entrained by the facing conveyor belts, they are gripped at spaced positions against transverse displacement. Twisting devices are positioned in the clear longitudinal passage defined between the facing conveyor belts, each device comprising facing upper and lower belts in alignment with the passage and cooperating to grip the ribbons against transverse displacement, and being turnable about a transverse axis to twist portions of the ribbon adjacent to the gripped portions. Devices for flattening the twisted ribbon portions are arranged between the twisting devices and the discharge belt.

10 Claims, 5 Drawing Figures

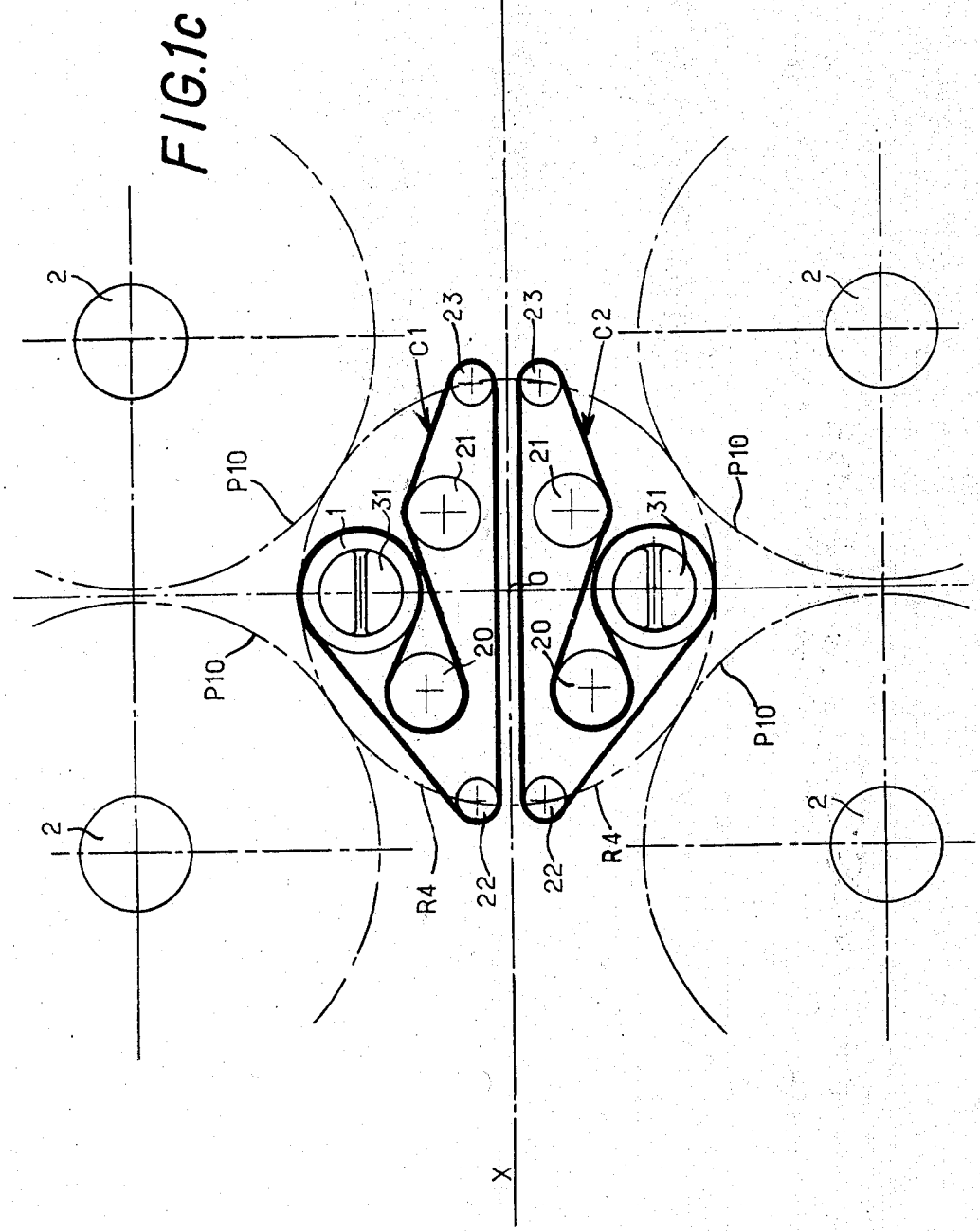

MACHINE FOR THE MANUFACTURE OF TWISTED DOUGH ARTICLES

This is a division of application Ser. No. 338,743, filed Mar. 7, 1973, now U.S. Pat. No. 3,889,012.

The present invention relates to a machine for manufacturing twisted bars from a strip of pastry-like material.

Cakes of folded pastry are presently manufactured from a strip of folded dough coated with powdered sugar, which is cut into transverse ribbons, the ribbons are then cut into small pieces and each piece is then manually twisted before being baked. This requires considerable labor and is accordingly expensive.

It is a primary object of this invention to provide a machine for automatically producing individual twisted pastry bars from a strip of pastry-like material in a continuously moving conveyor belt operation.

According to the invention, the machine comprises a supply belt supporting the strip and having a discharge end, and a discharge belt supporting and removing the twisted bars, the discharge belt being coplanar with the supply belt and spaced therefrom. Means for cutting the strip into successive, transversely extending ribbons is positioned adjacent the discharge end of the supply belt. Pairs of facing upper and lower conveyor belts define therebetween a bed for conveying the successive ribbons from the discharge end of the the supply belt to the discharge belt. The bed is coplanar with the supply and discharge belts and is positioned therebetween. The facing conveyor belts define a clear longitudinal passage for the ribbons therebetween and cooperate to entrain the ribbons from the supply to the discharge belt while gripping them at transversely spaced positions in the passage against displacement. A twisting device is positioned in the longitudinal passage between the transversely spaced positions. Each twisting device comprises facing upper and lower belts defining a clear longitudinal passage for alignment with the clear longitudinal passage defined between the conveyor belts and cooperating to grip the ribbons against displacement, and means for turning the cooperating twisting device belts about a transverse axis extending in the plane of the bed while a respective one of the ribbons is gripped therebetween to twist an adjacent portion of the gripped ribbon. Means for flattening the twisted ribbon portion is arranged between the twisting device and the discharge belt.

The above and other objects and features of the present invention will become more apparent from the following detailed description of a now preferred embodiment of the machine, taken in conjunction with the accompanying diagrammatic drawing wherein FIG. 1a is a section along line I—I of FIG. 2 and showing the arrangement of the various conveyor belts and the twisting device, as well as some of the controls therefor;

Figure 1A:
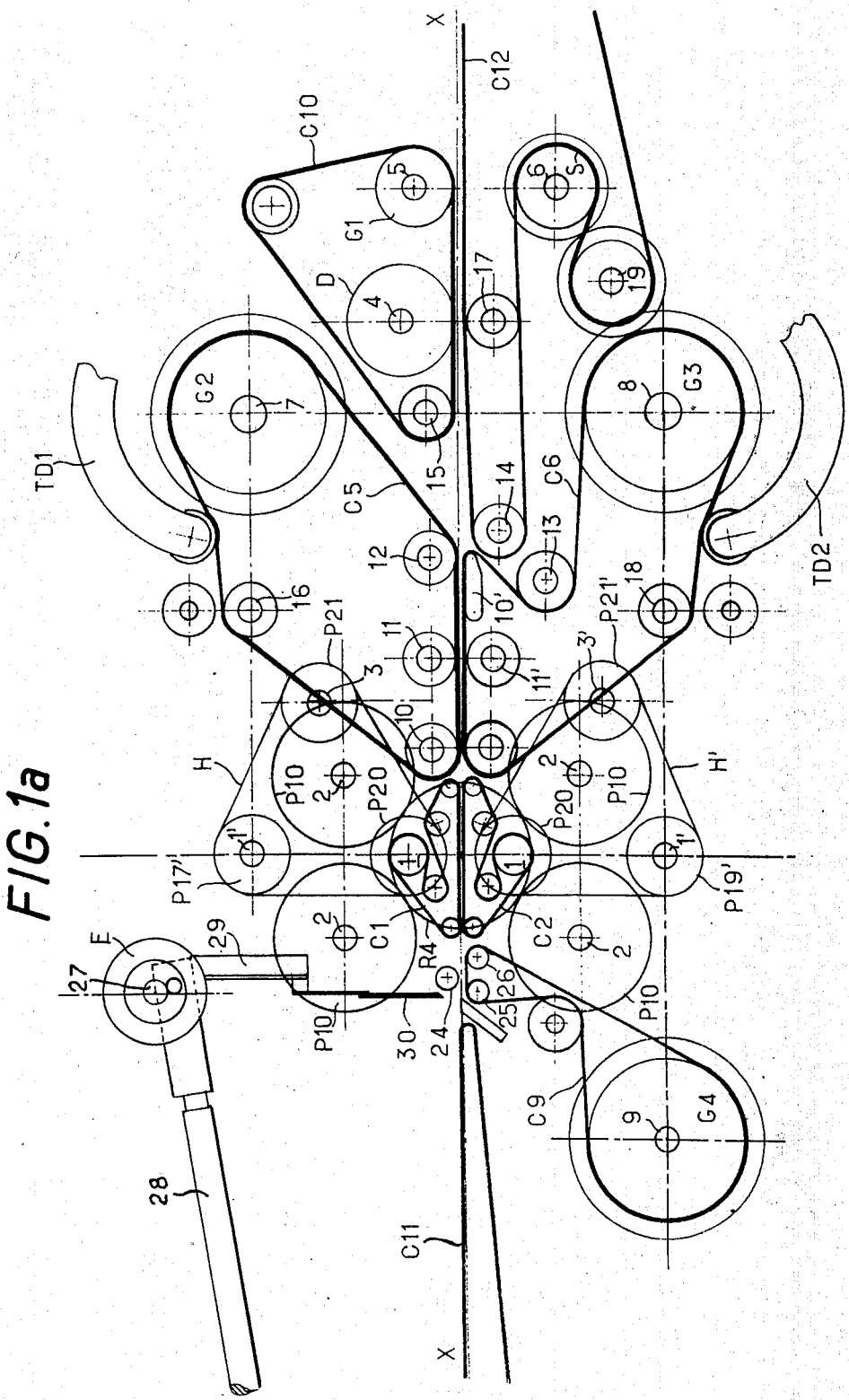
FIG. 1b is a similar view along line II—II of FIG. 2.
FIG. 1c is an enlarged sectional view of a twisting device.
Figure 1B:
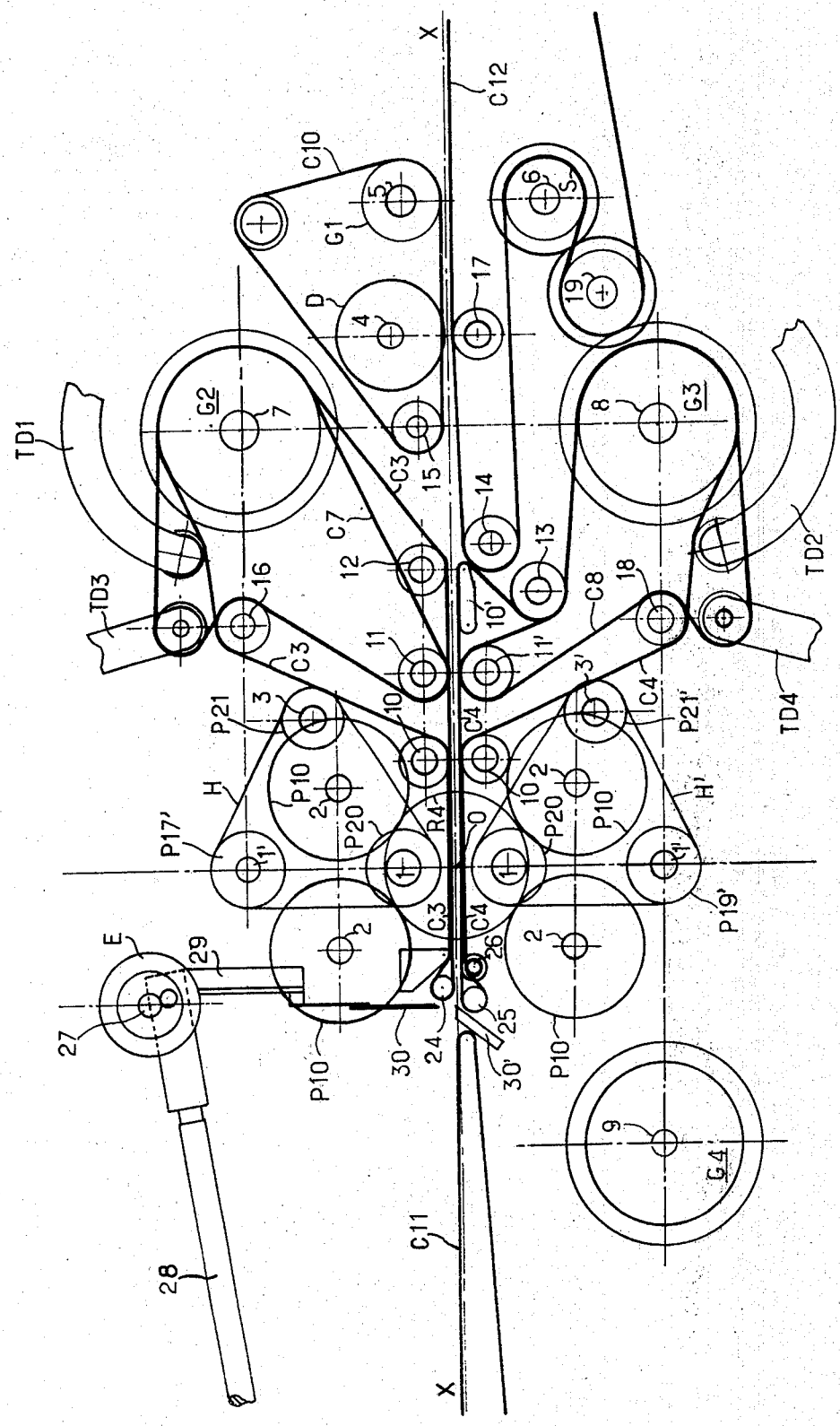
Figure 2:
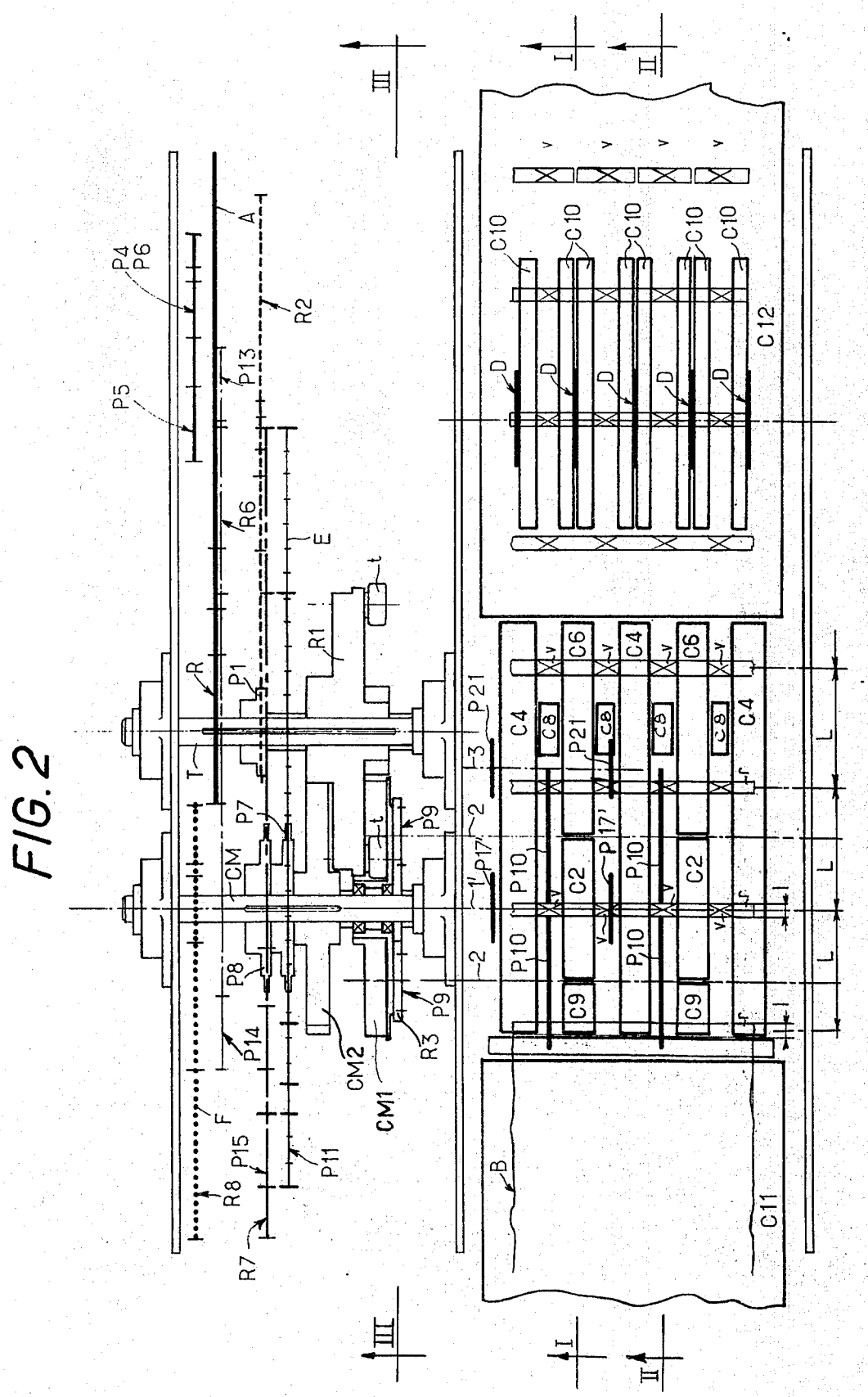
FIG. 2 is a plan view of the lower half of the machine below plane X—X, the conveyor and twisting device belts of the upper half being symmetrically arranged, and also showing the control mechanism for the conveyor belts and twisting devices.

Referring now to the drawing and more particularly to FIGS. 1a, 1b and 2, the machine is shown to comprise supply belt C11 for a strip of pastry-like material B and a discharge belt C12 for removal of the twisted pastry articles, the supply and discharge belts being coplanar in plane X—X and spaced from each other by a coplanar bed defined between pairs of facing upper and lower belts.

Upper belts C1, C3, C5 and lower belts C9, C2, C4, C6 are so arranged as to form therebetween a longitudinal passage in horizontal plane X—X between supply belt C11 and discharge belt C12. Successive pastry ribbons r are cut off transversely from strip B and are entrained by the upper and lower belts while simultaneously being slightly squeezed between facing belts C1 and C2, C5 and C6, and C3 and C4 to hold the ribbons at transversely spaced positions against displacement.

As shown in FIG. 2, ribbons r are entrained by three pairs of belts C3, C4 transversely spaced from each other and two pairs of belts C5, C6 transversely spaced from the three pairs of belts and extending between two respective pairs of belts C3, C4. The pair of facing belts C1, C2 also extend between these two pairs of belts in alignment with belts C5, C6 and form twisting devices for the entrained ribbons, the twisting devices being capable of being turned about an axis extending longitudinally of the ribbons in the horizontal plane for imparting twists to the ribbons, as will be described in more detail hereinafter with reference to FIG. 1c.

As will also appear from FIG. 2, additional pairs of facing belts C7, C8 are transversely spaced from each other and extend between adjacent pairs of belts C3, C4 and C5, C6 to form twist-flattening devices between the output ends of twisting devices C1, C2 and the input end of discharge belt C12.

As will be appreciated from FIGS. 1a, 1b and 1c, the facing upper and lower belts of each pair are symmetrical in respect to horizontal plane X—X, FIG. 2 showing twisted portions v in pastry ribbons r produced by the turning of twisting devices C1, C2 and subsequently flattened by devices C7, C8.

The lower belts C9 have no counterparts and are provided in alignment with twisting belts C1, C2 to support the ribbons r before they enter the bed between the twisting belts.

As shown in FIGS. 1a and 1b, a cutting assembly comprising transverse blade 30 is mounted between the discharge end of supply belt C11 and the input ends of belts C9 and C4 for cutting strip B into ribbons r. The blade cooperates with anvil 30' and a crank drive E vertically reciprocates the blade by means of the rods 29 while it controls the stepped advance of supply belt C11 by means of rod 28.

As best shown in FIG. 2, a plurality of pairs of upper belts C10 and two end belts C10 are transversely spaced above discharge belt C12 for cooperation therewith and to form a bed for the twisted pastry articles therebetween coplanar with the bed through which the ribbons r are entrained during twisting and flattening. Two pairs of belts C10 are in alignment with the twisting belts C2, C3 while one pair of belts C10 and the end belts are in alignment with entrainment belts C3, C4. Cutting discs D are mounted between the belts of each pair of belts C10 and laterally adjacent end belts C10 for cutting the twisted pastry articles at points equidistant from twisted portions v to produce the final pastries each comprising a flattened twisted portion intermediate the ends thereof, as shown on the right in FIG. 2.

The operation of the twisting devices will now be more fully described in connection with FIG. 1c. Each of the two symmetrical twisting belts C1, C2 is mounted on a semicircular gear wheel R4, the two gear wheels being separated by a gap permitting the free passage of ribbons r in plane X—X. Each gear wheel is supported by a lateral cheek (not shown) and these support cheeks are similarly separated to maintain the free passage therebetween. Each gear wheel meshes with a pair of pinions P10, rotation of a pinion 10 engaging gear wheels R4 rotating twisting belts C1, C2 about horizontal axis O. Since portions of ribbon r are squeezed between cooperating upper and lower belts C3 and C4, C1 and C2, C3 and C4, C1 and C2, and C3 and C4, thus being held against rotational displacement, the turning of the twisting devices about axis 0 will impart a twist to those portions of ribbon r extending between the squeezed portions thereof, as shown in FIG. 2.

Each endless belt C1, C2 is mounted on its semi-circular gear wheel R4 by training the belt over drive roller 1 and idle rollers 20, 21, 22 and 23, roller 21 acting as a tensioning roller for the belt. The drive rollers have a slotted projection 31, the slot of the projection being arranged to be engaged by a screwdriver-shaped member associated with a pinion P20 (see FIGS. 1a and 1b) when the belts of the twisting device are in horizontal alignment with the entrainment belts, i.e. in the position shown in FIG. 1c. When so engaged, rotation of pinions P10 will rotate drive rollers 1 and thus entrain belts C1, C2 to convey the twisted ribbons towards belts C5, C6, and onto discharge belt C12.

Figure 3:
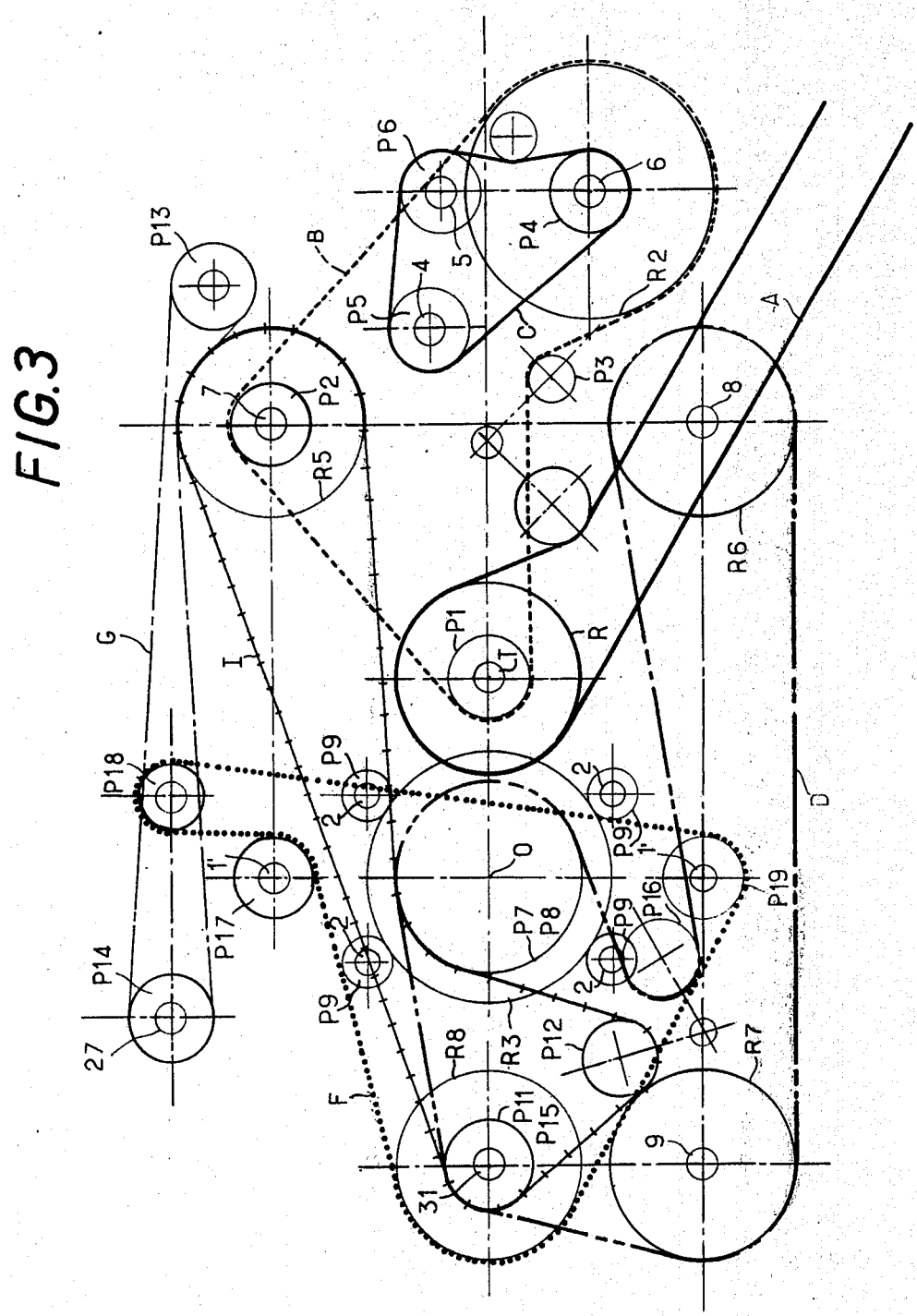
FIG. 3 is a side elevational view of the control mechanism, taken along line III—III of FIG. 2.

The control mechanism for the twisting machine operates as follows:

Referring to FIGS. 2 and 3, control gear wheel R is continuously driven by chain A entrained by a motor (not shown), the gear wheel being splined on shaft T which also carries pinion P1 and gear R1 (see FIG. 2). Gear R1 has mounted thereon four stops t spaced apart by 90°, two stops being diametrically opposed on one side and two stops being diametrically opposed on the other side of the gear.

Gear wheel R2 is drivingly connected to pinion P1 by chain B which is trained over pinion P2 and tensioned by engagement with pinion P3. Idling pinion P2 is rotatingly mounted on shaft 7 and integral with gear wheel R5. Gear wheel R2 is splined on shaft 6 which also carries pinion P4 and roller S (see FIG. 1a) for entraining discharge belt C12. Pinions P4 and P5 are drivingly connected to pinion P5 by chain C, which is trained over these pinions, pinion p5 being splined on shaft 4 which carries cutting discs D to entrain the discs and pinion P6 being splined on shaft 5 which carries rollers G1 over which belts C10 are trained (see FIG. 1a) to entrain these belts.

In this manner, continuously driven chain A causes the continuous movement of discharge belt C12 and facing belts C10 cooperating therewith, as well as the continuous rotation of cutting discs D to cut the twisted pastries as they are discharged. Also, gear wheel R5 drivingly engages chain G trained over pinions P13 and P14, pinion P14 being splined on shaft 27 which is thus driven to operate crank drive E which controls the reciprocation of blade 30 and the advance of supply belt C11. Movement of the cutting blade is so controlled that it cuts a ribbon r off the pastry-like material strip B each time the advance of the lower belts is stopped.

Through alternating engagement with stops t during each quarter revolution of gear R1, Maltese cross CM1 and CM2 are alternatingly entrained (see FIG. 2), each cross being immobilized while the other cross executes a quarter revolution. Maltese cross CM1 idles on shaft CM and is integral with gear wheel R3 while cross CM2 is splined on shaft CM which also fixedly carries pinions P7 and P8 adjacent cross CM2. Four satellite pinions P9 are arranged about the periphery of gear wheel R3 in meshing engagement therewith, each pinion being splined on a shaft 2 which also fixedly carries pinions P10 which engage and drive gear wheels R4 of the twisting devices. In this manner, Maltese cross CM1 controls the operation of the twisting devices.

A chain I is in meshing engagement with pinion P7, the pinion turning in response to the movement of Maltese cross CM2 and driving chain I which is trained over idling pinion P11, tensioning pinion P12 and gear wheel R5 splined on shaft 7. As shown in FIG. 1a, shaft 7 fixedly carries drive roller G2 which entrains upper belts C3, C5 and C7 which are trained over idler rollers 10, 11, 12 and 16.

A chain D is trained over pinion P8, which in response to the movement of Maltese cross CM2 entrains the chain, to drive gear R6 splined on shaft 8, gear R7 splined on shaft 9 and pinion P15 splined on shaft 31, chain D also being trained over tensioning pinion P16. As shown in FIG. 1a, shaft 8 fixedly carries drive roller G3 which entrains lower belts C4, C6 and C8 which are trained over guide and tensioning idler rollers 11', 13 and 18 as well as guide 10'. Shaft 9 fixedly carries drive rollers G4 which entrains lower belts C9 trained over idler rollers 25, 26.

Gear wheel R8 is in meshing engagement with chain F for entraining the chain to drive pinions P17 and P19, chain F being trained over tensionsing pinion P18. Driven pinions P17 and P19 are splined on upper and lower shafts 1', respectively, to drive these shafts which fixedly carry several upper pinions P17' and lower pinions P19', respectively, as best shown in FIGS. 1a and 1b. Chain H is trained over each upper pinion and pinion P21, and chain H' is trained over each lower pinion and pinion P21', the driven upper and lower pinions entraining the chains and thus driving pinions P21 and P21' fixedly carried respectively on shafts 3 and 3', as well as pinions P20 over which the chains are also trained.

As has been explained hereinabove in connection with the operation of the twisting devices best shown in FIG. 1c, a screwdriver-shaped member is associated with pinions P20 so as to control the operation of drive rollers 1 for twisting belts C1 and C2. Thus, the quarter revolutions of Maltese cross CM2 will control the intermittent forward movements of twisting belts C1 and C2 in synchronization with the forward movements of belts C3 to C9 to transport ribbons r from supply belt C11 to discharge belt C12 while driven chain A continuously rotates master gear wheel R.

Chain A continuously drives belts C10 and C12, as well as cutting discs D, at the same circumferential speed.

As has been explained hereinabove, Maltese cross CM2 remains immobile when Maltese cross CM1 executes a quarter revolution so that, while each twisting device consisting of belts C1, C2 executed a complete revolution about horizontal axis 0, supply belt C11 advances only by width 1 corresponding to the width of each cut ribbon r. On the other hand, during the immobility of Maltese cross CM1 and the quarter revolution of Maltese cross CM2, twisting belts C1 and C2, as well as conveyors belts C3 to C9 are each advanced by length L which is slightly exceeded by the turning diameter of the twisting devices.

The machine may be used in the manufacture of what are known in France as "tortillons," i.e. small pastry bars having a twisted central portion. For this purpose, a strip B of folded-over dough with a coating of sugar may be placed on supply belt C11 and chain A is entrained to advance the supply belt stepwise through the operation of crank drive E and to cut the strip in ribbons r by reciprocation of cutting blade 30.

Continuously driven chain A will simultaneously advance conveyor belts C3 to C9 and twisting belts C1, C2, a quarter revolution of Maltese cross CM2 advancing a ribbons r to axis 0 of the twisting devices while, at the same time, the succeeding ribbon is cut off. Maltese cross CM1 will now execute a quarter revolution to turn the twisting devices by 180° about axis 0 to impart twists v to the ribbon gripped between the twisting belts while the succeeding ribbon remains stationary. The succeeding revolution of Maltese cross CM2 will advance the belts again to remove the twisted ribbon from the twisting devices and convey the succeeding ribbon to the twisting devices, and this cycle of operations is repeated while chain A is driven.

While the illustrated machine is arranged to cut four twisted bars from each ribbon, as shown on the right of discharge belt C12 in FIG. 2, the number of such products may be readily increased by providing longer ribbons and additional twisting devices and cutters arranged transversely of the path of the ribbons through the machine.

Tests carried out with the machine described hereinabove and illustrated in the accompanying drawing have proven that 260 twisted bars could be produced per minute.

The present invention is not limited to the described embodiment but may be modified in any manner obvious to those skilled in the art, with the scope of the appended claims.

What we claim is:

1. A machine for manufacturing twisted bars from a strip of a pastry-like material, comprising
   a. a supply belt supporting the striip and having a discharge end,
   b. a discharge belt supporting and removing the twisted bars, the discharge belt being coplanar with the supply belt and spaced therefrom,
   c. means for cutting the strip into successive, transversely extending ribbons, the cutting means being positioned adjacent the discharge end of the supply belt,
   d. pairs of facing upper and lower conveyor belts defining therebetween a bed for conveying the successive ribbons from the discharge end of the supply belt to the discharge belt, the bed being coplanar with the supply and discharge belts and being positioned therebetween,
      1. a clear longitudinal passage for the ribbons being defined between the facing conveyor belts and
      2. the facing belts cooperating to entrain the ribbons from the supply to the discharge while gripping them at transversely spaced positions in the passage against displacement,
   e. a twisting device positioned in the longitudinal passage between the transversely spaced positions, the twisting device comprising
      1. facing upper and lower belts, the upper and lower twisting device belts defining a clear longitudinal passage for alignment with the clear longitudinal passage defined between the conveyor belts and cooperating to grip the ribbons against displacement, and
      2. means for turning the cooperating twisting device belts about a transverse axis extending in the plane of the bed while a respective one of the ribbons is gripped therebetween to twist an adjacent portion of the gripped ribbon, and
   f. means for flattening the twisted ribbon portion arranged between the twisting device and the discharge belt.

2. The machine of claim 1, further comprising an input conveyor belt for conveying the successive ribbons from the discharge end of the supply belt to the twisting device, and a pair of facing output conveyor belts delivering the twisted ribbons from the twisting device to the discharge belt.

3. The machine of claim 1, wherein the twisting device comprises a pair of semi-circular gear wheels spaced from each other to provide said clear longitudinal passage, and a series of rollers including a drive roller mounted on each of the gear wheels, the twisting device belts being trained over the rollers and being entrained by the drive rollers to convey the ribbons through the twisting device upon operation of the drive rollers, and the gear wheels being rotatable to turn the cooperating twisting device belts about the transverse axis.

4. The machine of claim 3, further comprising rotary members for releasably engaging the drive rollers, the drive rollers being operated by the rotary members upon engagement of the rotary members with the drive rollers.

5. The machine of claim 3, further comprising four drive pinions evenly distributed about the peripheries of the gear wheels, two of the pinions meshing with each of the gear wheels for rotating the gear wheels.

6. The machine of claim 1, wherein the means for flattening the twisted ribbon portion comprises a pair of facing upper and lower belts gripping and flattening the twisted ribbon portion therebetween.

7. The machine of claim 1, wherein the cutting means comprises a stationary transverse anvil adjacent the discharge end of the supply belt and a vertically reciprocable, transversely extending blade cooperating with the anvil, and further comprising a crank drive controlling movement of the supply belt to provide an intermittent advance thereof and synchronously controlling the reciprocation of the blade to cut a respective one of the ribbons each time the supply belt stops.

8. The machine of claim 1, further comprising cutting means mounted above the discharge belt for cutting the twisted ribbons into a plurality of pieces.

9. The machine of claim 1, further comprising entrainment means for moving the conveyor belts intermittently and for turning the twisting device each time the conveyor belts stop, the length of each intermittent movement of the conveyor belts exceeding the length of the twisting device.

10. The machine of claim 9, wherein the entrainment means comprises a first Maltese cross intermittently rotatable through successive angular rotations for intermitttently turning the twisting device, one of the Maltese crosses being stationary when the other one rotates.

* * * * *